Dec. 22, 1925.
A. H. GROSZ
1,566,595
TRACTION INCREASING ATTACHMENT FOR MOTOR VEHICLE WHEELS
Filed Oct. 10, 1925
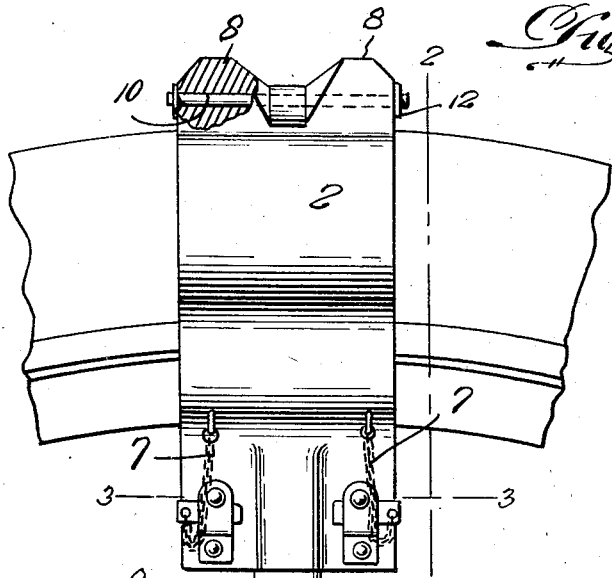
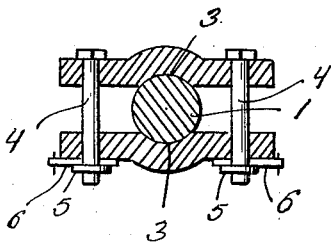
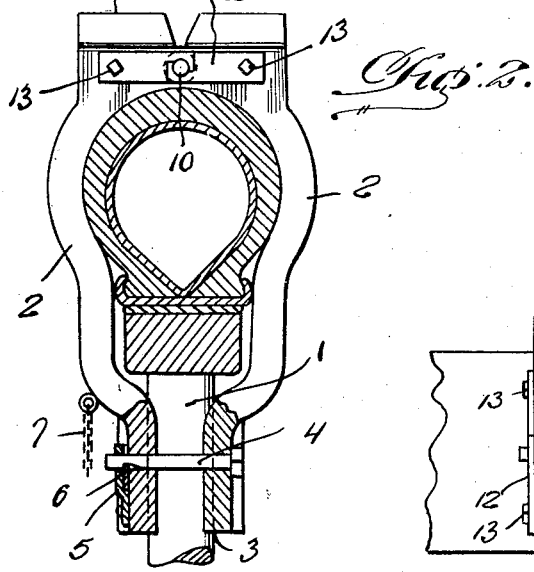
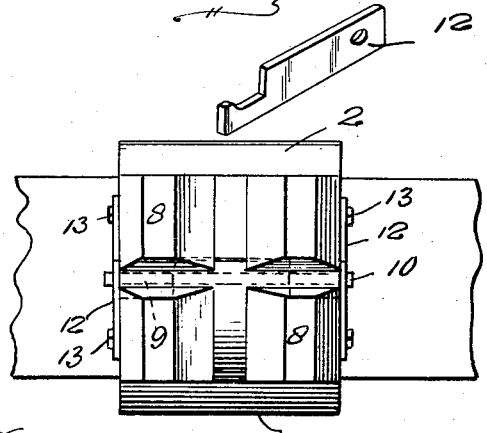
Inventor
Adam H. Grosz,
By
Attorney Patented Dec. 22, 1925.

1,566,595

UNITED STATES PATENT OFFICE.

ADAM H. GROSZ, OF NEW ORLEANS, LOUISIANA.

TRACTION-INCREASING ATTACHMENT FOR MOTOR-VEHICLE WHEELS.

Application filed October 10, 1925. Serial No. 61,747.

*To all whom it may concern:*

Be it known that I, ADAM H. GROSZ, a citizen of the United States, residing at New Orleans, in the parish of Orleans and State of Louisiana, have invented certain new and useful Improvements in a Traction-Increasing Attachment for Motor-Vehicle Wheels, of which the following is a specification.

The object of my said invention is the provision of a simple, easily and securely applied, and efficient attachment for motor vehicle wheels, calculated to enable a motor vehicle to pull out of holes and to be free to move on bad roads.

To the attainment of the foregoing, the invention consists in the improvement as hereinafter described and definitely claimed.

Figure 1 is a side elevation, partly in cross section, showing my novel attachment as applied properly to a portion of a wheel.

Figs. 2 and 3 are sections on the lines 2—2 and 3—3 respectively of Fig. 1.

Fig. 4 is a view showing the outer end of the attachment.

Fig. 5 is a perspective of the outer bolt of the attachment, and

Fig. 6 is a perspective of one of the locking bars complementary to said bolts.

Similar numerals of reference designate corresponding parts in all of the views of the drawings.

The wheel illustrated and designated by the character 1 is a spoke wheel of the ordinary well known type.

My novel attachment comprises members 2 designed to be arranged in straddling relation over the tire and felly of the wheel and at opposite sides of one spoke thereof. The inner portions of the members 2 are channeled at their inner sides as indicated at 3 so as to fit the spoke and preclude creeping of the attachment on the wheel.

The said inner portions of the members 2 are detachably connected together through the medium of headed and notched bolts 4 in combination with key holders 5 fixed on one of the members 2 and keys 6; the said keys 6 being permanently connected by chains 7 with the said member 2, and being adapted to be arranged as shown in Figs. 1 and 2, relatively to the bolt 4 with the result that the bolts will be securely held against casual displacement. When, however, the keys 6 which are slightly tapered, are withdrawn from the holders 5, the bolts 4 may be expeditiously and easily removed and the inner portions of the members 2 may be swung away from each other. Each of the members 2 is provided at its outer end with calks 8 which are preferably, although not necessarily, of the type illustrated. On the inner sides of the outer portions of the members 2 are knuckles 9 designed to be arranged in alined relation as appears in Fig. 2 and removably arranged in the said members 9 with a view to hingedly connecting the members 2 is a bolt or pintle 10 having adjacent to its ends circumferential grooves 11. When the bolt 10 is placed in the knuckles 9 to hingedly connect the members 2 together, the grooves 11 will be positioned to receive the notched locking bars 12 which are permanently and pivotally connected to the members 2 at the point 13, while the bars 12 serve effectively in preventing endwise displacement of the bolts or pintles 10 and do not interfere in any measure with the inner portions of the members 2 being swung apart or away from each other for ready removal of the attachment from the wheel.

It will be noted, however, that when the attachment is removed from the wheel, the locking bars 12 may be swung out of engagement with the grooves 11 and the bolt 10, whereupon the said bolt 10 may be withdrawn to disconnect the members 2. This is manifestly advantageous inasmuch as it permits when one of the members 2 is worn or broken, of said member 2 being replaced with a new member without loss of the other member 2 and the appurtenances of the attachment.

When my novel attachment is secured on a wheel in the manner illustrated and described, it will be apparent that the attachment is not liable to casual displacement, that the attachment is calculated to greatly increase the attachment of the wheel with the result that the wheel can be worked out of holes and will serve adequately to propel an automobile over miry and rough roads.

It will also be apparent that notwithstanding facilities with which the attachment may be applied or removed from the wheel and the capacity of the attachment for maintaining itself on the wheel, the attachment is simple and easy to manufacture and construct.

Having thus described my invention, what I claim as new and desire to secure by Letters-Patent is:

In an attachment for increasing the traction capacity of a wheel, the combination of members having on the inner sides of the outer portions alined apertured knuckles, a bolt removably arranged in said knuckles and hingedly connecting said members together and having circumferential grooves adjacent to one of its ends, and locking bars one to each member pivotally connected to the side of the member, said bars having near their free ends notched portions seated in said grooves of the bolt.

In testimony whereof I affix my signature.

ADAM H. GROSZ.